Figure 1:
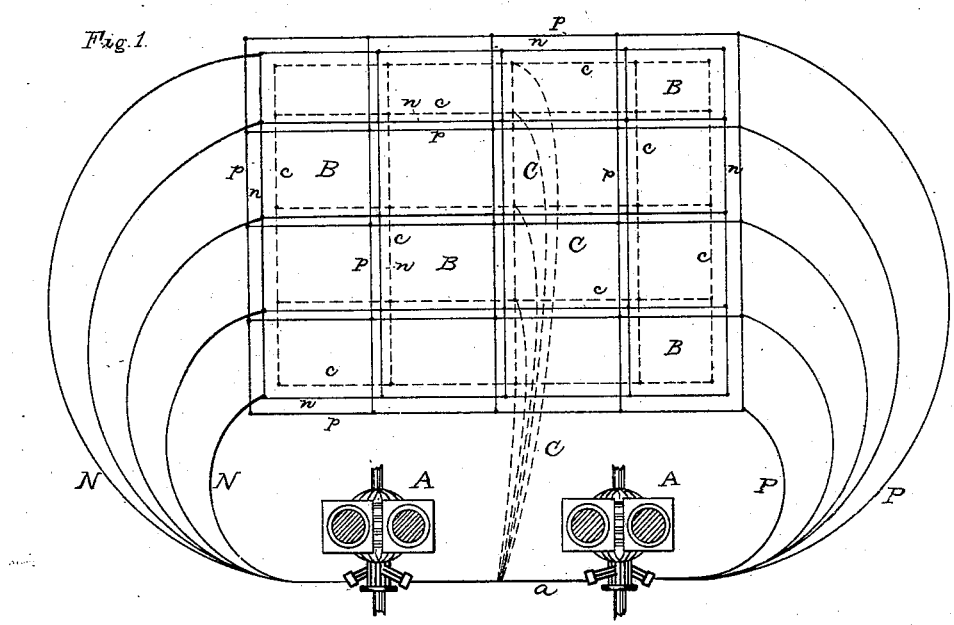

(No Model.)

T. A. EDISON.
SYSTEM OF ELECTRICAL DISTRIBUTION.

No. 283,985. Patented Aug. 28, 1883.

ATTEST:
E. C. Rowland
H. W. Seely

INVENTOR:
Thomas A. Edison
By Rich'd N. Dyer,
Att'y.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRICAL DISTRIBUTION.

SPECIFICATION forming part of Letters Patent No. 283,985, dated August 28, 1883.

Application filed January 22, 1883. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 535,) of which the following is a specification.

My invention relates to systems of electrical distribution, such as are described in my application No. 520, (Serial No. 77,776,) wherein translating devices arranged in multiple series are made independently controllable by the use of a compensating conductor or conductors extending from the points of division of a divided source of electrical energy and connected between the translating devices in multiple series; and my invention consists, primarily, in the application of this compensating principle to a system of intersecting and connected positive and negative conductors to which current is conveyed by feeding-circuits containing no translating devices. Such feeding-circuits are preferably so arranged that all parts of the system will practically be electrically equidistant from the central station or source of energy, so that the same, or practically the same, pressure or electro-motive force will be maintained in all parts of the system without the use of adjustable resistances in the feeding-conductors.

In carrying my invention into effect the main conductors of the system are arranged in the manner set forth in several of my prior patents—that is, all the positive conductors are connected together at intersecting points, and likewise all the negative conductors.

The source of electrical energy may consist of any desired number of dynamo or magneto electric machines or other generators arranged in series or in multiple series. If one dynamo or magneto electric machine is used, one or more extra commutator-brushes are provided, from which the compensating-conductors extend for dividing the source of energy into the proper number of parts, and where two or more generators are placed in series the compensating-conductors are connected between them to the conductor which extends from one to another.

The several positive feeding-conductors which extend from the positive pole of the source of energy are preferably all connected at different points to the positive main conductor at one side or boundary of the district supplied, and all the negative feeders are correspondingly connected to the negative main conductor at the opposite side of the system. By this arrangement all the translating devices supplied from the same feeding-circuit are made electrically equidistant from the source of energy.

The conducting capacity of the feeding-conductors is so proportioned that all the points at which they are connected to the main conductors will be electrically equidistant from the source of energy—that is, those conductors which are connected at points near the source are made smaller than those which extend to a greater distance—so that the drop in electro-motive force will be the same on all the feeding-circuits, such circuits, although of different lengths, being of practically the same resistance.

Throughout the system, parallel with the intersecting main conductors, extends a system of intersecting compensating-conductors, connected together at their intersecting points. The number of such compensating-conductors depends upon the number of translating devices in series, they being used to divide the multiple-arc circuits into a number of parts equal to the number of translating devices which it is desired to place in multiple series, which number, of course, varies according to the electro-motive force of the current used.

Each multiple-arc circuit which contains a translating device is connected across from a compensating-conductor to either a positive or a negative main conductor, the number of translating devices on each side of the compensating-conductor being as nearly equal as is conveniently practicable. The translating devices therefore are arranged in multiple series.

At the centers of the system—that is, at points midway between the junctions of the positive and negative feeding-conductors with the main conductors—are connected to the intersecting compensating-conductors one or more conductors, which extend to the source of energy, being connected at the points of division of such source. These I term the "main compensating-conductors."

As explained in the application above referred to, when differences occur in the number of translating devices in circuit on each side of a compensating-conductor the difference of current is taken up by such compensating-conductor, such current flowing therein in one direction or the other according to whether the preponderence is on the positive or on the negative side. Thus each translating device always receives a constant supply of current, and they are independently controllable, although arranged in multiple series.

Instead of connecting all the positive feeders at one side of the system and all the negative at the other, a portion of the positive (or negative) may be connected at one side and the remainder at the other, while all of the opposite kind are connected midway between them. In this case I employ two sets of main compensating-conductors, each set running to points midway between the pairs of feeding-conductors, but both sets being connected at the point of division of the source of energy.

Figure 2:
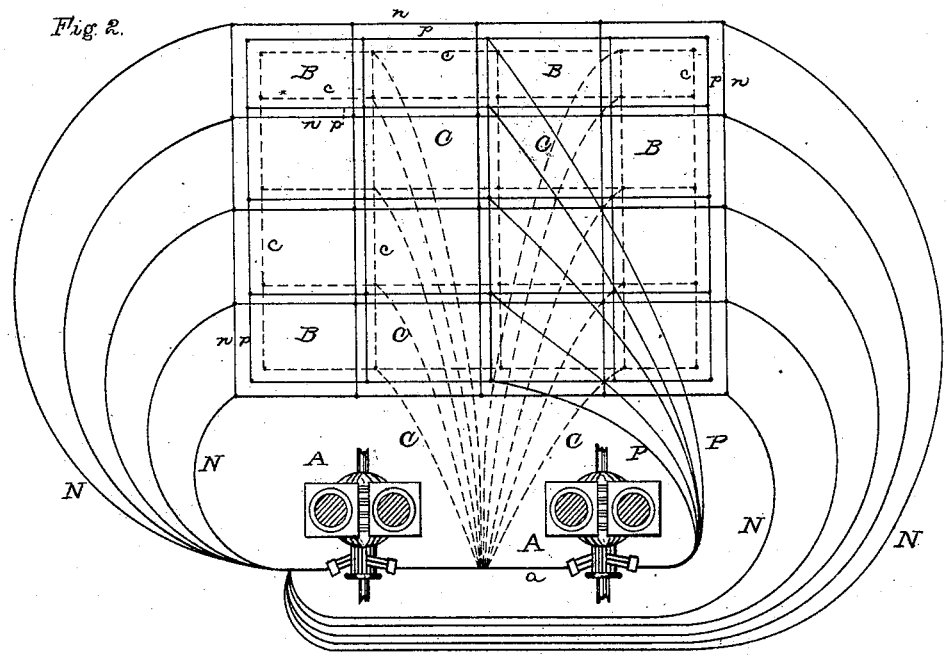

My invention may be more readily comprehended by reference to the annexed drawings, in which Figure 1 is a diagram illustrating a system in which opposite feeding-conductors are connected to opposite sides of the district; Fig. 2, a diagram illustrating the system in which conductors of one kind are connected in the center and those of the other kind at the sides; and Fig. 3 is a diagram illustrating the principle of the invention.

Figure 3:
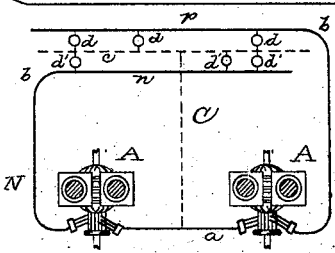

Referring to Fig. 3, A A are dynamo or magneto electric machines, connected in series by a conductor, $a$. A positive conductor, P, and negative conductor N, extend from the respective poles of the series of generators. These may be considered as feeding-conductors as far as the points $b\,b$, the remainder, $p\,n$, being considered, respectively, as the positive and negative main conductors. Parallel with the main conductors $p\,n$ is run a compensating-conductor, $c$, and a main compensating-conductor, C, runs from the center of conductor $c$, and is connected with conductor $a$ between the generators. The multiple-arc circuits which contain translating devices $d$ extend from the compensating-conductor $c$ to the positive main conductor $p$, and the circuits containing devices $d'$ extend from conductor $c$ to negative conductor $n$. The translating devices $d$ and $d'$ are thus in multiple series, but are independently controllable by reason of the compensating-conductors C and $c$, as is fully explained in my prior application, above mentioned. It is evident that where currents of higher electro-motive force are used, so that more translating devices are placed in series, the source of energy would be divided into three or more parts, and two or more compensating-conductors would be used.

Referring, now, to Fig. 1, it is readily apparent that the complete system of electrical distribution there shown is merely a multiplication or extension of the arrangement illustrated in Fig. 3.

Instead of one positive conductor, P, and one negative conductor, N, a number of such conductors extend from the generators A A, and a series of intersecting positive and negative main conductors, $p$ and $n$, are arranged surrounding the blocks B B of a town or village or district thereof. The feeding-conductors are connected on opposite sides of the systems, those of each pair terminating at points opposite to each other and at the same distance from the source of supply. The conductors of those pairs which terminate near the source of supply are of smaller mass than those which extend to a greater distance, in order that the electro-motive force may be the same in all parts of the system. A system of intersecting and connected compensating-conductors, $c$, are arranged parallel to the main conductors $p\,n$, and the connections of the circuits which contain translating devices are made as illustrated in Fig. 3. The main compensating-conductors C are connected to one of the compensating-conductors $c$ midway between the positive and negative feeding-circuit terminals, there being as many conductors C as there are feeding-circuits P N, so that all the intersecting compensating-conductors are connected to the divided source of energy, all the conductors C being connected at the same point to the conductor $a$.

It will be seen that by this arrangement of conductors the electro-motive force, and consequently the relative candle-power, of the lamps in every part of the system will remain equal and constant, while the compensating-conductors cause the lamps in series to always receive the same current, although one or more of the same series may be thrown out of circuit.

The generators A A should be provided with suitable means for regulating their electro-motive force according to the whole number of translating devices in circuit throughout the system.

The arrangement shown in Fig. 2 is similar in principle to that in Fig. 1. In the former a portion of the negative feeding-conductors N are connected at one side of the district and the remainder at the opposite side, while all the positive feeders P are connected at the middle of the district between the negative ones. Thus the translating devices in both halves of the district are practically electrically equidistant from the central station. Two sets of main compensating-conductors are used, connected, as shown, midway between the positive and negative terminals, and all running to the same point in conductor $a$. Of course in both arrangements the number of intersecting compensating-conductors would be increased according to the number of translating devices placed in series, as explained with reference to Fig. 3.

What I claim is—

1. A system of electrical distribution having in combination the following elements, viz: a divided source of electrical energy, one or more feeding-circuits extending therefrom, a series of intersecting and properly-connected positive and negative main conductors to which said feeding-circuits are connected, translating devices in multiple series, a series of intersecting compensating-conductors, and one or more main compensating-conductors extending from said intersecting compensating-conductors to the point or points of division of the source of energy, substantially as set forth.

2. In a system of electrical distribution, the combination of the divided source of energy, the intersecting and properly-connected main conductors, feeding-conductors extending from said source and connected to said main conductors at points electrically equidistant from said source, translating devices arranged in multiple series, and a system of intersecting and main compensating-conductors, substantially as set forth.

3. In a system of electrical distribution, the combination of a divided source of energy, a system of intersecting and properly-connected positive and negative main conductors, a system of intersecting compensating-conductors, one or more feeding-circuits, the conductors of each feeding-circuit being connected to the main conductors at different points, and one or more main compensating-conductors, one connected to the intersecting compensating-conductors at a point intermediate between the conductors of each feeding-circuit, substantially as set forth.

This specification signed and witnessed this 13th day of January, 1883.

THOS. A. EDISON.

Witnesses:
H. W. SEELY,
EDWARD H. PYATT.